United States Patent [19]
Johnson et al.

[11] Patent Number: 5,878,384
[45] Date of Patent: Mar. 2, 1999

[54] SYSTEM AND METHOD FOR MONITORING INFORMATION FLOW AND PERFORMING DATA COLLECTION

[75] Inventors: Charles George Johnson, Lilburn, Ga.; Ramnath A. Lakshmi-Ratan, New Providence, N.J.; Steven G. Lanning, Gillette, N.J.; Bernard S L Renger, New Providence, N.J.

[73] Assignee: AT&T Corp, Middletown, N.J.

[21] Appl. No.: 625,607

[22] Filed: Mar. 29, 1996

[51] Int. Cl.[6] .................................................. G06F 17/00
[52] U.S. Cl. ................ 702/187; 395/200.3; 395/200.54; 395/680
[58] Field of Search ............................. 395/200.11, 491, 395/800, 200.3, 200.47, 200.49, 200.5, 200.54, 680, 683, 681, 835; 364/550, 551.01, 222.5, 225, 225.1, 227.1, 918, 918.1, 919, 99.4; 702/179, 187, 188

[56] References Cited

U.S. PATENT DOCUMENTS

| | | | |
|---|---|---|---|
| 5,032,979 | 7/1991 | Hecht et al. | 364/200 |
| 5,488,409 | 1/1996 | Yuen et al. | 346/5 |
| 5,497,479 | 3/1996 | Hornbuckle | 395/491 |
| 5,590,056 | 12/1996 | Barritz | 364/550 |
| 5,613,089 | 3/1997 | Hornbuckle | 395/491 |
| 5,675,510 | 10/1997 | Coffey et al. | 364/514 A |

*Primary Examiner*—Patrick Assouad

[57] ABSTRACT

An information monitoring system for the collection of all real-time information activity between a user and a variety of information services. The real-time interaction between a user using a communication device to interface with an information service is monitored to collect certain predetermined information which characterizes the nature of the user's interaction with a particular information service. The information is collected on a operation by operation basis and is ultimately aggregated at a central location for data analysis purposes.

33 Claims, 2 Drawing Sheets

SYSTEM AND METHOD FOR MONITORING INFORMATION FLOW AND PERFORMING DATA COLLECTION

FIELD OF THE INVENTION

The present invention relates to data collection, and more particularly, to a data monitoring and collection system.

BACKGROUND OF THE INVENTION

Recent trends in personal computing, data communications, on-line services, computer hardware and application program software have transformed the ordinary household into a hotbed of information and communication activity. Increasingly, individuals have computers, facsimile machines, modems, entertainment centers, cable-ready televisions and multiple telephones all located in their households for facilitating a variety of communications. Due to the increased usage of such devices in the household, many product retailers and service providers are interested in, and assign great value to, the collection of data representing the usage habits of individuals at the household level. For example, market researchers target the collection of data to aid in the evaluation of the effectiveness of alternative forms of television commercials.

The prior art is replete with various systems and arrangements for monitoring the viewing habits of television viewers. Early systems collected data at a given viewer site for later manual collection. Such manually collected data included, for example, identification of television channels viewed and the times of viewing for various panels of viewers in order to determine market share and ratings of various television programs. Later systems were designed for use with cable television systems which have two-way communications over the cable system between the head end of the system and various cable subscribers. In this type of system, the television sets themselves are periodically contacted from the central location over the cable connection, with the channel selection and time information being sent back to the central location. Other prior art systems incorporate storage devices (e.g., memory) at the remote location for accumulating the relevant viewing data over time. The accumulated data is then periodically transmitted over conventional telephone lines from the remote locations to the central location by telephone calls initiated by either the remote stations or the central location itself.

In the past, systems for remotely accumulating data regarding the habits of television viewers and their qualitative reaction to viewed material were important from a market research standpoint. For example, the effectiveness of television commercials can be monitored by correlating the viewing of those commercials with the subsequent purchase activities of panelists whose viewing habits are being monitored. One prior art system for data gathering with particular utility in market research type applications is described in U.S. Pat. No. 4,546,382, issued on Oct. 8, 1985, to McKenna et al. (hereinafter "McKenna"). This patent describes a system that includes a plurality of remote units which are controlled from a central location. Each of the remote units is attached to a television receiver which is generally but not necessarily attached to a cable system. Each of the remote units can function to determine which of several television (hereinafter "TV") modes is in use, as well as to store TV channel selector data, data from an optical input device, and/or data input by viewers representative of the composition of the viewing audience. The data is stored for either later collection by a portable data collector, or for direct transmission to the central location by each of the remote units. A video message for a TV viewer (e.g., a survey question) may be transmitted from the central location and stored at the remote units for later display on the TV receiver associated with the remote units. In sum, a variety of television-related metering devices and data collection systems are well known which are placed in the household and transparent to the occupants of the household which monitor TV channel changes, viewing habits, accumulate time on a given channel and other information, and communicate the data gathered to a central location (e.g., server) using dedicated telephone lines.

Data collection systems, such as described in McKenna, directed at TV data collection have provided transparent mechanisms to collect TV-related usage data from households. However, increasingly in today's home environments, the occupants have, and interact with, a variety of other devices. For example, the following devices are becoming commonplace in households: computers, facsimile machines, modems, multiline telephones and entertainment centers. Just as remotely accumulating data regarding the habits of television viewers is important from a market research standpoint so is similar data which can be collected from these other devices. For example, computers equipped with high-speed modems allow individuals within the household to make a variety of purchases from electronic on-line services or to access various types of product or market data from electronic sources. From a market research standpoint, capturing data regarding such transactions is invaluable in order to market the product and/or services to the home.

SUMMARY OF THE INVENTION

In particular, monitoring all the inbound and outbound information activity at the household level can provide important information regarding individual usage. For example, monitoring the real-time interaction between an on-line service and a household user can provide important information regarding the type of information being accessed or the time of day a particular service is accessed. Thus, the on-line service provider can customize certain offerings based upon data collected from the user base. Another type of user interaction which could be monitored is with the local personal computer (hereinafter "PC") and application software loaded on a particular PC. For example, when a user is actively running a particular application software, the type of information which could be collected would include: time of loading the software package, total usage time of the application, types of files accessed or types of functions accessed by the user.

As the usage of various information devices becomes commonplace in the household, and such devices are used increasingly to interact with on-line services, it will be advantageous to provide a system which would allow for the collection of all information activity on a real-time basis.

An object of the present invention is thus to provide a system and method for the monitoring and collection of all inbound/outbound information activity and communications activity at a particular user location, for example, a household equipped with a variety of devices having communication capabilities. In accordance with an aspect of the present invention, the real-time interaction between a user and an external information service is monitored and specific data are collected regarding that real-time interaction. For example, when a user is connected to a commercial information service (e.g., CompuServe or Prodigy) connectivity data (e.g., date/time of interactive session, number of packets sent/received, file name, application ID, etc . . . ) are collected. In addition, other substantive data (e.g., type of service, type and number of inquiries made, etc . . . ) regarding the real-time interaction are collected. The information is collected in real-time, on a operation-by-operation basis, and is ultimately aggregated, for example, at the household level in a central location. The aggregated data is thereafter transmitted to a central server for data analysis purposes.

In accordance with the preferred embodiment of the invention, the information monitoring and collecting is facilitated by using a stub program module which inserts itself in the execution control flow between a target application (i.e., the application being monitored) and the functions (i.e., application program interface—API) that are being called. Advantageously, the insertion of the stub program module allows for the profiling of the real-time interaction between, for example, the user and the information service. The profiling is realized by capturing and logging specific network connectivity and substantive activity data. A so-called "trapping" technique is used to intercept function calls and messages, received from and transmitted to, the target program module. The trapping of all function calls allows for the complete logging and profiling of target module operations, and therefore, provides the basis for profiling the real-time interaction between the user and the service.

DETAILED DESCRIPTION

Figure 1:
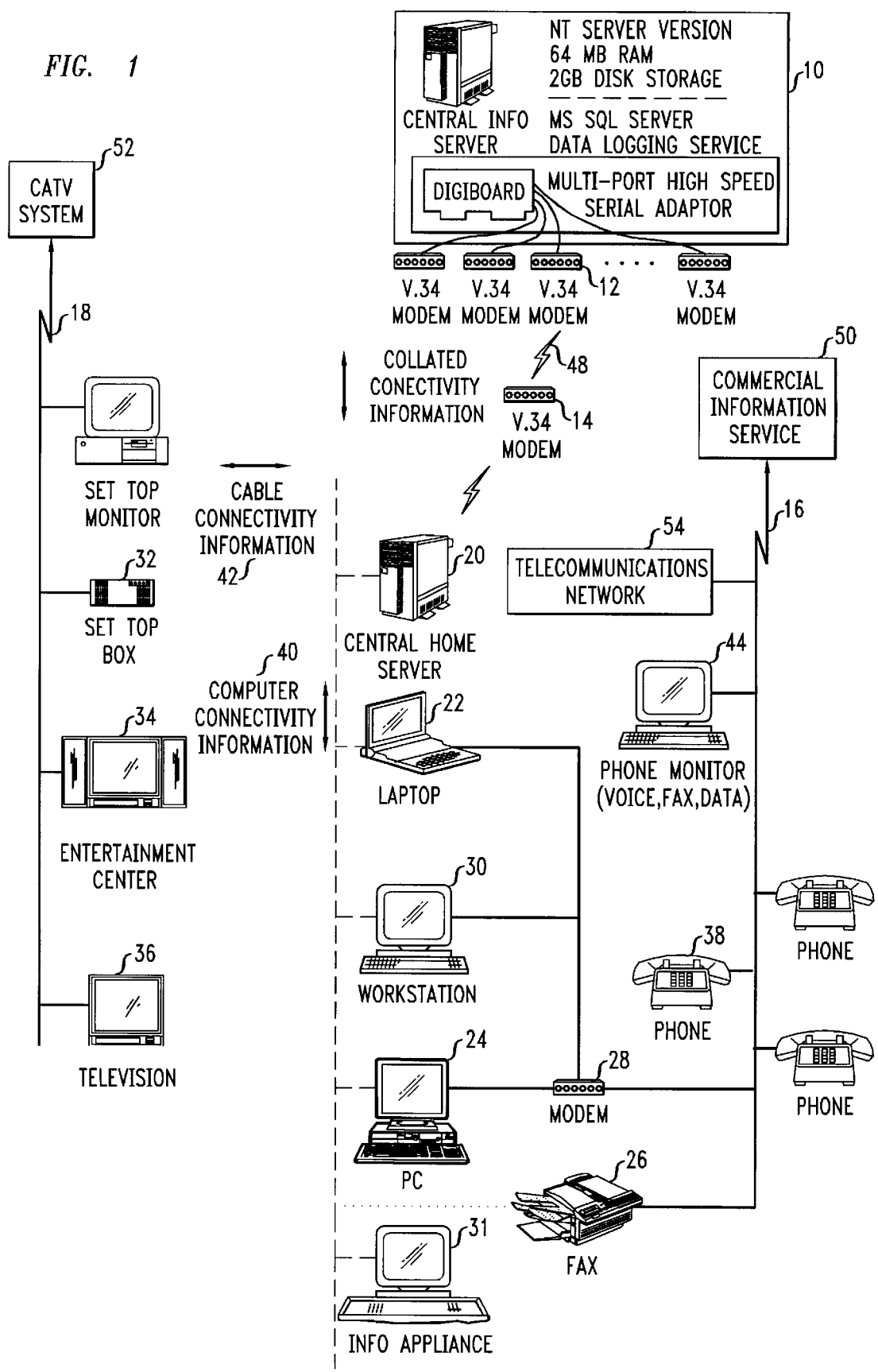
FIG. 1 is a diagram of an illustrative overall system in accordance with the present invention.

FIG. 1 shows an illustrative system employing the present invention. In the embodiment shown in FIG. 1, a central information collection server 10 communicates with a central information aggregator 20 located, for example, in a user's household. Communication between server 10 and aggregator 20 is facilitated by modems 12 and 14 which exchange data in a conventional manner over, for example, a POTS telephone connection supported by data communication medium 48. In accordance with an aspect of the present invention, aggregator 20 will collect inbound and outbound information regarding the activities of various hardware devices such as a laptop computer 22, personal computer 24, workstation 30, facsimile machine 26, information appliance 31, telephone 38, set top box 32, entertainment center 34 and television 36. These devices may, for example, be co-located within a single user household. The inbound and outbound activities being monitored include items such as on-line information service usage (e.g., Prodigy or CompuServe) and information regarding the facility used to engage the service (e.g., the Internet). In accordance with an aspect of the invention, the real-time interaction between a user and such a commercial on-line information service 50 is monitored to collect information such as, but not limited to, type of services accessed by the user, time spent using each individual service, type and quantity of information downloaded by user, the time of day the user logged on the service, total connect time and data exchange rate. Advantageously, this real-time information is periodically collected from the individual devices being monitored by aggregator 20 and sent to server 10 where the data is analyzed to indicate certain user trends.

In a similar fashion, information is collected regarding the user's interaction with a cable television system 52 (hereinafter "CATV") and a telecommunications network 54. CATV information collected includes items such as tuned channels, holding time for each channel, data connection, connect time, time of day and information uploaded. Telecommunications network 54 information collected includes items related to voice communication, and, for example, connect time, dialed outgoing telephone number, caller ID for incoming calls, time of day, holding time and connection status. In addition, facsimile communication such as dialed number, connect time, data rate, pages of information transmitted/received, time of day and connection status may be collected. Further, data communication information such as dialed number, connect time, data rate, modem setup, time of day and connection status may also be collected.

In typical personal computer systems, the interaction between a computer user and the commercial information service (e.g., CompuServe, Prodigy, electronic bulletin boards, services available over the Internet, etc . . . ) is facilitated by certain application software. The application software provides certain mechanisms for user connectivity and interactivity with an on-line service. In accordance with the present embodiment, such interactivity and connectivity are accomplished, for example, in the well known Windows v.3.1 operating system (from Microsoft Corporation) environment by using so-called calling and target program modules. As an example, a user executes an application program which provides the user interface (i.e., application program interface —API) to the commercial information service. This application program is executed within the "calling" module and will employ the target module to complete the communication link with the information service. In this example, the target module provides the communication drivers to establish and maintain a data connection between the user's personal computer and the information service. No mechanism, however, is provided in such a system to capture any substantive information regarding the actual real-time interactive session between the user and the information service. Program modules establish the appropriate connections and provide the required user interface for the user to effectively use the service, but do not monitor the information activity across the interface for data collection purposes.

By contrast, in accordance with the embodiment, the real-time interaction between the user and the on-line information service is monitored and select information collected in regard to the interactive session. We have realized that the monitoring of the real-time interaction can be accomplished using a software infiltration technique. Software infiltration analysis occurs at run-time and captures certain information regarding the operation and activities of software application programs. In accordance with the preferred embodiment, infiltration is accomplished by using a stub program module which inserts itself in the execution control flow between a target application and the functions that are being called from the calling module.

Figure 2:
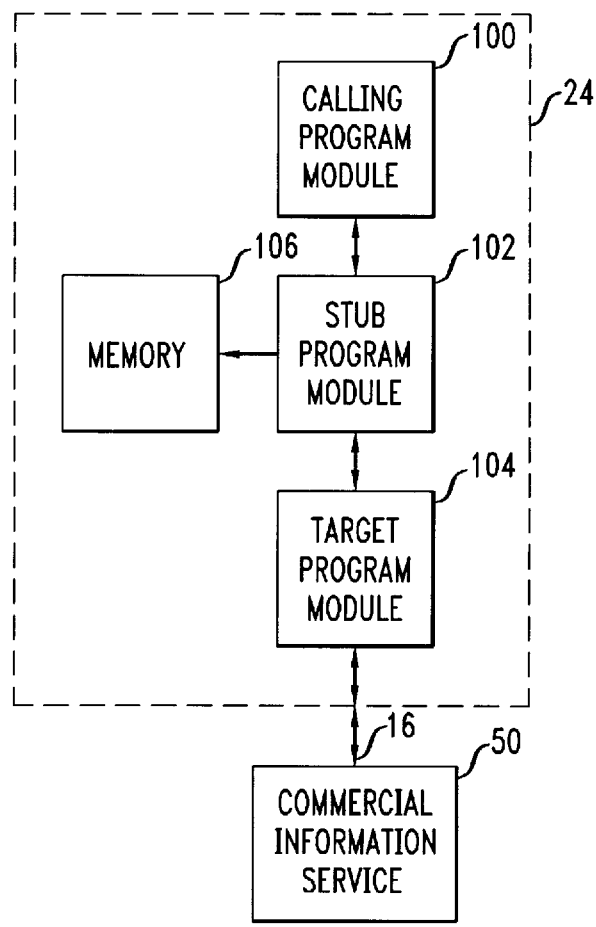
FIG. 2 is a block diagram of an illustrative embodiment for monitoring and collecting information in the system of FIG. 1.

More particularly, FIG. 2 illustrates an embodiment of the present invention wherein a connection between, for example, personal computer 24 and the source of the commercial information service 50 is established via data communication medium 16. As will be appreciated by those skilled in the art, the description and details contained herein pertaining to personal computer 24 are equally applicable to other devices having communication capabilities (e.g., laptop 22, workstation 31, facsimile 26 shown in FIG. 1). The user employs personal computer 24 to interact with information service 50 and it is this interaction which is advantageously monitored in accordance with the present invention. As shown, calling program module 100, stub program module 102, target program module 104 and memory 106 all reside within PC 24. Calling program module 100 is used to execute the application program which will provide the functions to the user for interacting with service 50. Stub program module 102 is loaded and placed in the execution control flow between calling program module 100 and target program module 104. Target program module 104 contains the software drivers, in this example modem drivers, needed to establish the connection across data communication medium 16 between PC 24 and information service 50. The manner in which stub program module 102 is loaded by PC 24 will be discussed below.

Advantageously, the insertion of stub program module 102 allows for the profiling of the real-time interaction between the user (via PC 24) and information service 50. The profiling is realized by capturing and logging specific network connectivity and substantive activity data. A so-called "trapping" technique is used to intercept API function calls and messages, received from and transmitted to, target program module 104. The trapping of all function calls allows for the complete logging and profiling of target program module operations, and therefore, provides the basis for profiling the real-time interaction between the user and information service 50. In accordance with the embodiment, the function calls and messages are trapped by employing the so-called "loading software stub" technique.

The basic premise of "loading" is that a function call (i.e., call supplied by API of calling program module 100) is intercepted between the source of the call (i.e., API) and the destination of the call (i.e., target program module 104). In accordance with the embodiment, stub program module 102 is written as a dynamic link library (hereinafter "DLL") in the Windows v.3.1 operating system. A DLL is a library of shared functions that individual applications link to at runtime as opposed to compile time. Advantageously, by constructing the stub program module as a DLL, it can be constructed for any target program module without requiring the modification of any target module source code.

Thus, in accordance with the embodiment, stub program module 102 is loaded by the Windows operating system loader at runtime. Stub program module 102 is configured in such a way that it imports target program module 104 which is accomplished by the demand loading of target program module 104 by the Windows operating system. Stub program module 102 is further configured to carry the name of target program module 104 to facilitate the interception of function calls. For example, in the embodiment, calling program module 100 sends a function call in response to a user input for receiving certain information from information service 50 (e.g., user selects a particular software icon presented by application program). This function call, unbeknownst to calling program module 100, is intercepted by stub program module 102 which captures the function call and associated parameter data, and then passes the function call to target program module 104 as originally intended by calling program module 100. Similarly, stub program module 102 collects function calls and associated parameter data transmitted from target program module 104 to calling program module 100. Therefore, the operation of stub program module 102 is transparent to both calling program module 100 and target program module 104.

In accordance with the embodiment, the information collected by stub program module 102 with regard to the real-time interaction between the user and information service 50 is stored in local memory 106 of PC 24. Illustratively, connectivity data (e.g., date/time of interactive session, number of packets sent/received, file name, application ID, etc . . . ) and substantive data regarding the real-time interaction (e.g., type of service, type and number of inquiries made, etc . . . ) are stored in a series of "flat" data structures. Again illustratively, in a further embodiment of the present invention, Uniform Resource Locator (hereinafter "URL") information is collected by stub program module 102 during user connections to the Internet and, in particular, the well-known World Wide Web (hereinafter "WWW"). The well-known URL's are employed when using the WWW for identifying particular resources (e.g., information services) associated with the URL's (typically a one-line address associated with each resource). That is, the WWW uses URL's to locate particular resources across the entire Internet. In accordance with this embodiment, the URL information is captured as a string of ASCII text. Due to the transmission characteristics associated with the Internet, this captured ASCII text contains both the URL and other, extraneous characters. The extraneous characters must be removed for the correct identification of the URL. Thus, in accordance with this embodiment, a filter is applied to the ASCII text string to search for the URL string components which are known to be in the form, for example, "toolname://site address/pathname/filename". The captured URL is then stored in a data structure as described above.

Upon completion of the interactive session, the data structures are transferred to a set of connectivity session files. These files are named, illustratively, by the date of the session and are indexed by the number of the session for a particular day. Periodically, the files saved in memory 106 are uploaded to central server 20 (see FIG. 1) which aggregates information from all the hardware devices being monitored. Thereafter, central server 20 sends the information to server 10 via data communication medium 48, for example, on a periodic (e.g., once a day) or polled basis. As will be appreciated by those skilled in the art, the functionality and services provided by central server 20 may also be supplied, for example, by PC 24 thereby eliminating the need for a dedicated piece of computer hardware used for server purposes only.

The foregoing merely illustrates the principles of the present invention. Those skilled in the art will be able to devise numerous alternative arrangements which, although not explicitly shown or described herein, embody those principles and are thus within the spirit and scope of the invention as defined in the appended claims.

We claim:

1. An information monitoring system comprising:
   a plurality of devices, said plurality of devices being adapted to communicate with a plurality of information services over a data communication medium;
   each of the devices including a computer having an operating system and at least one calling program to be executed under the operating system, said at least one calling program generating function calls to at least one target program and facilitating a user interface between a user and at least one of said information services;
   means for monitoring a predetermined set of attributes defining characteristics of a data connection, over said data communication medium, between one of said devices and one of said information services the means for monitoring functioning to monitor the execution control flow between the calling program and the target program to intercept said function calls; and means for collecting data regarding said predetermined set of attributes during said data connection.

2. An information monitoring and collection system comprising:

a workstation, said workstation adapted for interfacing a user with a plurality of information services across a data communication medium, the sources of said plurality of information services being external to said workstation, the workstation including an operating system and at least one calling program to be executed under the operating system, said at least one calling program generating function calls to at least one target program and facilitating a user interface between a user and at least one of said information services;

means for establishing a connection between said workstation and one of said information services;

means for monitoring a real-time interaction between said user of said workstation and said information service, said real-time interaction occurring across said connection, the means for monitoring functioning to monitor the execution control flow between the calling program and the target program to intercept said function calls; and means for collecting a predetermined set of data during said real-time interaction between said user and said information service.

3. An information monitoring and collection system comprising:

a personal computer, said personal computer including an operating system and at least one calling program to be executed under the operating system, said at least one calling program generating function calls to at least one target program, said calling program adapted for interfacing a user with at least one information service across a data communication medium, the source of said information service being external to said personal computer;

means for establishing a connection between said personal computer and said information service;

means for monitoring an interaction between said user of said personal computer and said information service, said interaction occurring across said connection, said means for monitoring functioning to monitor the execution control flow between the calling program and the target program to intercept said function calls; and means for collecting a predetermined set of data during said interaction between said user and said information service.

4. An information monitoring and collection system comprising:

a data communication device, said device adapted for interfacing a user with a plurality of information services across a data communication medium, the sources of said information services being external to said device, said device including an operating system and at least one calling program to be executed under the operating system, said at least one calling program generating function calls to at least one target program;

means for monitoring an interaction between said user of said device and one of said information services, the means for monitoring functioning to monitor the execution control flow between the calling program and the target program to intercept said function calls, said interaction occurring across said data communication medium; and means for collecting a predetermined set of data during said interaction between said user and said information service.

5. The system of claim 1, wherein said data communication device is selected from the group consisting of personal computer, facsimile machine, workstation, modem and telephone.

6. The system of claim 3, wherein said data communication medium supports a POTS connection.

7. The system of claim 3 or 4, wherein said means for monitoring further comprises:

a stub program module, the execution of said stub program module providing for the interception and recordation of communications between said calling program module and said target program module.

8. The system of claim 3, wherein said means for collecting further includes a memory device for storing said collected predetermined set of data.

9. The system of claim 1, 2 or 4, wherein said plurality of information services includes at least one service available from the Internet.

10. The system of claim 8, wherein said collected predetermined set of data stored in said memory device is periodically transmitted to a central server.

11. The system of claim 3 or 4, wherein said predetermined set of data identifies usage characteristics of said interaction between said user and said information service.

12. An information monitoring and collection method, said method comprising the steps of:

providing a communication device having an operating system and at least one calling program to be executed under the operating system; said at least one calling program generating function calls to at least one target program and facilitating a user interface between a user and at least one information service;

establishing a communication link between the communication device and the information service, the source of said information service being external to said communication device;

monitoring a real-time interaction between said communication device and said information service by monitoring said function calls; and collecting a predetermined set of data during said real-time interaction, said set of data defining particular usage characteristics of said interaction.

13. A method for monitoring the interaction between a user and an information service, said method comprising the steps of:

providing a communication device having an operating system and at least one calling program to be executed under the operating system; said at least one calling program generating function calls to at least one target program and facilitating a user interface between a user and at least one information service;

establishing a communication link between said user and said information service;

monitoring an interaction between said user and said information service by monitoring said function calls, said interaction occurring across said communication link; and collecting a predetermined set of data during said interaction, said set of data defining particular usage characteristics of said user.

14. The method of claim 13 wherein said user employs a personal computer to interact with said information service during said interaction.

15. The method of claim 13, wherein said collecting step employs a memory to store said collected predetermined set of data as a set of data files.

16. The method of claim 15, including the further step of:
transmitting said set of data files to a central server on a periodic basis.

17. A method for monitoring the interaction between a user and a plurality of information services, said method comprising the steps of:
providing a communication device having an operating system and at least one calling program to be executed under the operating system; said at least one calling program generating function calls to at least one target program and facilitating a user interface between a user and at least one information service;
establishing a communication link between said user and at least one of said information services;
monitoring a plurality of interactions between said user and said information service by monitoring said function calls, each said interaction of said plurality of interactions occurring across said communication link;
collecting a plurality of predetermined sets of data, each said predetermined set of data being collected during a respective one said interaction, each said set of data defining particular usage characteristics of said user; and
transmitting said collected plurality of predetermined sets of data to a central server.

18. The method of claim 13, wherein the source of said information service is located on the Internet.

19. The method of claim 18, where said predetermined set of data includes a Uniform Resource Locatior associated with said source.

20. The method of claim 13, wherein said monitoring step further comprises the step of:
executing a stub program module providing the interception and recordation of communications between said calling program module and said target program module.

21. The method of claim 18, wherein said stub program module is written as a dynamic link library.

22. An information monitoring and collection system comprising:
a personal computer, said personal computer adapted for interfacing a user with at least one information service across a data communication medium, the source of said information service being external to said personal computer, said personal computer including an operating system;
means for establishing a connection between said personal computer and said information service;
means for monitoring an interaction between said user of said personal computer and said information service, said interaction occurring across said connection; and
means for collecting a predetermined set of data during said interaction between said user and said information service;
said means for monitoring user interaction further comprising
a calling program module executed under said operating system, the execution of said calling program module providing said user with an application programming interface for said information service;
a target program module, the execution of said target program module providing for the servicing of function calls from said application programming interface; and
a stub program module, the execution of said stub program module providing for the interception and recordation of data in the bi-directional data stream between said calling program module and said target program module.

23. The system of claim 22 wherein said predetermined set of data identifies usage characteristics of said interaction between said user and said information service.

24. The system of claim 22 wherein said interaction between said user and said information service occurs in real-time.

25. An information monitoring and collection system comprising:
a data communication device, said device adapted for interfacing a user with a plurality of information services across a data communication medium, said information services having sources external to said device, said data communication device including an operating system;
means for monitoring an interaction between said user of said device and one of said information services, said interaction occurring across said data communication medium;
means for collecting a predetermined set of data during said in on between said user and said information service,
said means for monitoring user interaction further comprising
a calling program module executed under said operating system, the execution of said calling program module providing said user with an application programming interface for said information service;
a target module, the execution of said target program module providing for the servicing of function calls from said application programming interface; and
a stub program module, the execution of said stub program module providing for the interception and recordation of data in the bi-directional data stream between said calling program module and said target program module.

26. The system of claim 25, wherein said predetermined set of data identifies usage characteristics of said interaction between said user and said information service.

27. The system of claim 25, wherein said interaction between said user and said information service occurs in real-time.

28. A method for monitoring the interaction between a user and an information service, said method comprising the steps of:
establishing a communication link between said user and said information service;
monitoring an interaction between said user and said information service, said interaction occurring across said communication link; and
collecting a predetermined set of data during said interaction, said set of data defining particular usage characteristics of said user,
wherein said interaction monitoring step further comprises the steps of
executing a calling program module under an operating system thereby providing said user with an application programming interface for said information service;

executing a target program module providing the servicing of function calls from said application programming interface; and executing a stub program module providing the interception and recordation of data in the bi-directional data stream between said calling program module and said target program module.

29. A method as noted in claim 28 wherein said interaction between said user and said information service occurs in real time.

30. A system for monitoring real-time interaction between an application program loaded in a computer and functions contained in said application program being requested by a user through an interface between said user and a calling program loaded in said computer to be executed under an operating system, comprising:

a stub program interposed in an execution control flow between said calling program and said application program, said stub program operative to intercept and record function calls and associated parameter data flowing from said calling program to said application program;

said stub program further operative to intercept function calls and associated parameter data flowing in the bi-directional data stream between said application program and said calling program; and a storage device for receiving and staring said function calls and associated parameter data for further processing.

31. The system of claim 30 wherein said stub program is transparent to both said calling and said application programs.

32. The system of claim 30 wherein said stored function calls and parameter data comprise connectivity data and substantive data.

33. A method for use in a computer for monitoring real-time interaction between a application loaded in said computer and functions contained in said application program being requested by a user through an interface between said user and a calling program loaded in said computer and executed by said computer under an operating system, comprising the steps of:

interposing a stub program in an execution control flow between said calling program and said application program;

using said stub program for intercepting function calls and associated parameter data flowing in the bi-directional data stream between said calling program and said application program and from said application program to said calling program; and receiving and storing said function calls and associated parameter data for further processing.

* * * * *